United States Patent
Lee

(10) Patent No.: US 12,270,444 B2
(45) Date of Patent: Apr. 8, 2025

(54) MOTOR-DRIVEN DRUM BRAKE SYSTEM AND METHOD OF CONTROLLING THE SAME

(71) Applicant: HL MANDO CORPORATION, Pyeongtaek-si (KR)

(72) Inventor: Hongmyeong Lee, Cheonan-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 412 days.

(21) Appl. No.: 17/746,278

(22) Filed: May 17, 2022

(65) Prior Publication Data

US 2022/0373048 A1 Nov. 24, 2022

(30) Foreign Application Priority Data

May 24, 2021 (KR) ................ 10-2021-0066337

(51) Int. Cl.
*F16D 65/22* (2006.01)
*F16D 121/24* (2012.01)

(52) U.S. Cl.
CPC .......... *F16D 65/22* (2013.01); *F16D 2121/24* (2013.01)

(58) Field of Classification Search
CPC ...... B60T 17/221; B60T 13/74; B60T 13/745; B60T 1/067; B60T 8/17; B60Y 2400/81; F16D 51/24; F16D 51/22; F16D 65/22; F16D 2121/04; F16D 2121/24; F16D 2125/40; F16D 2125/52
USPC ........................................................ 188/156
See application file for complete search history.

(56) References Cited

U.S. PATENT DOCUMENTS

| | | | | |
|---|---|---|---|---|
| 8,215,721 B2* | 7/2012 | Ninoyu | ................ | B60T 13/588 303/3 |
| 2007/0299566 A1* | 12/2007 | Goss | ..................... | B60T 17/221 701/1 |
| 2010/0010719 A1* | 1/2010 | Bauer | ..................... | B60T 7/107 701/70 |
| 2010/0206677 A1* | 8/2010 | Shiraki | ................ | B60T 13/741 188/325 |
| 2012/0303233 A1* | 11/2012 | Kato | ........................ | B60T 7/12 701/70 |
| 2013/0087418 A1* | 4/2013 | Han | ........................ | B60T 7/107 188/78 |
| 2019/0225198 A1* | 7/2019 | Bast | ...................... | B60T 8/1725 |

FOREIGN PATENT DOCUMENTS

KR 10-2009-0039059 A 4/2009

* cited by examiner

*Primary Examiner* — Robert A. Siconolfi
*Assistant Examiner* — San M Aung
(74) *Attorney, Agent, or Firm* — Hauptman Ham, LLP

(57) ABSTRACT

Provided is motor-driven drum brake system including: a motor-driven drum brake including a brake shoe inside a drum and allowing the brake shoe to be pressed on an inner surface of the drum by hydraulic pressure of a wheel cylinder or an operation of a motor to perform braking; and a controller configured to control the motor to engage the motor-driven drum brake, wherein the controller is configured to, upon a total count of parking apply operations of the motor-driven drum brake being greater than a preset count when performing a parking apply operation, correct a target clamping force of the motor-driven drum brake and perform the parking apply operation according to the corrected target clamping force.

7 Claims, 7 Drawing Sheets

MOTOR-DRIVEN DRUM BRAKE SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2021-0066337, filed on May 24, 2021 in the Korean Intellectual Property Office, the disclosure of which is incorporated herein by reference.

BACKGROUND

1. Field

The present disclosure relates to a motor-driven drum brake system for generating parking braking force by operating a drum brake with a motor, and a method of controlling the same.

2. Description of the Related Art

There is disclosed Korean Patent Laid-Open No. 10-2009-0039059, directed to a motor-driven drum brake, which is a drum-integrated electronic control parking brake that is electrically operated by an actuator to generate parking braking force.

The motor-driven drum brake has a structure in which a pair of brake shoes provided inside a drum rotating together with a wheel and having brake linings attached thereto are expanded by an electric actuator to brake the drum.

Conventionally, when determining the target clamping force of the motor-driven drum brake, the number of operations of the motor-driven drum brake is not considered.

When replacing the brake linings, a burnishing operation for uniform contact between the drum and the brake is required to meet the target clamping force.

When the motor-driven drum brake has operated only a small number of times, the brake shoes are not sufficiently burnished and the motor-driven drum brake generates a clamping force lower than the target clamping force, whereby the vehicle may be pushed during parking apply.

If the target clamping force is set to be high in preparation for the above situation, the motor-driven drum brake may generate the target clamping force when the number of operations of the motor-driven drum brake is small, but as the number of operations of the motor-driven drum brake increases, sufficient burnishing occurs in the brake shoes, so that excessive clamping force is generated, and the durability and lifespan of the product may be reduced.

SUMMARY

Therefore, it is an object of the disclosure to provide a motor-driven drum brake system capable of improving the durability and lifespan of a product by reducing a target clamping force of the motor-driven drum brake according to a burnishing state of a brake shoe, and a method of controlling the same.

The technical objectives of the disclosure are not limited to the above, and other objectives may become apparent to those of ordinary skill in the art based on the following descriptions.

According to an aspect of the disclosure, there is provided a motor-driven drum brake system including: a motor-driven drum brake including a brake shoe inside a drum and allowing the brake shoe to be pressed on an inner surface of the drum by hydraulic pressure of a wheel cylinder or an operation of a motor to perform braking; and a controller configured to control the motor to engage the motor-driven drum brake, wherein the controller is configured to, upon a total count of parking apply operations of the motor-driven drum brake being greater than a preset count when performing a parking apply operation, correct a target clamping force of the motor-driven drum brake and perform the parking apply operation according to the corrected target clamping force.

The controller may be configured to store a parking apply count for the motor-driven drum brake in a memory whenever a parking apply operation is performed, and accumulate the parking apply count stored in the memory to recognize the total count of parking apply operations.

The controller may be configured to, upon the total count of parking apply operations of the motor-driven drum brake being greater than the preset count and a total hydraulic amount of the motor-driven drum brake being greater than a preset hydraulic amount when performing the parking apply operation, reduce the target clamping force of the motor-driven drum brake.

The controller may be configured to store a hydraulic amount of the motor-driven drum brake in a memory whenever a parking apply operation and a braking operation are performed, and accumulate the hydraulic amount stored in the memory to recognize the total hydraulic amount of the motor-driven drum brake.

According to another aspect of the disclosure, there is provided a method of controlling a motor-driven drum brake system, which is a method of controlling a motor-driven drum brake including a brake shoe inside a drum and allowing the brake shoe to be pressed on an inner surface of the drum by hydraulic pressure of a wheel cylinder or an operation of a motor to perform braking, the method including: comparing a total count of parking apply operations of the motor-driven drum brake with a preset count when performing a parking apply operation; when a result of the comparison is that the total count of parking apply operations is greater than the preset count, correcting a target clamping force of the motor-driven drum brake; and performing the parking apply operation according to the corrected target clamping force.

The method may further include, upon the total count of parking apply operations of the motor-driven drum brake being greater than the preset count and a total hydraulic amount of the motor-driven drum brake being greater than a preset hydraulic amount, correcting the target clamping force of the motor-driven drum brake.

The method may further include: accumulating a parking apply count stored in a memory whenever a parking apply operation is performed, to recognize the total count of parking apply operations; and accumulating a hydraulic amount of the wheel cylinder stored in a memory whenever a parking apply operation and a braking operation are performed, to recognize the total hydraulic amount of the motor-driven drum brake.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
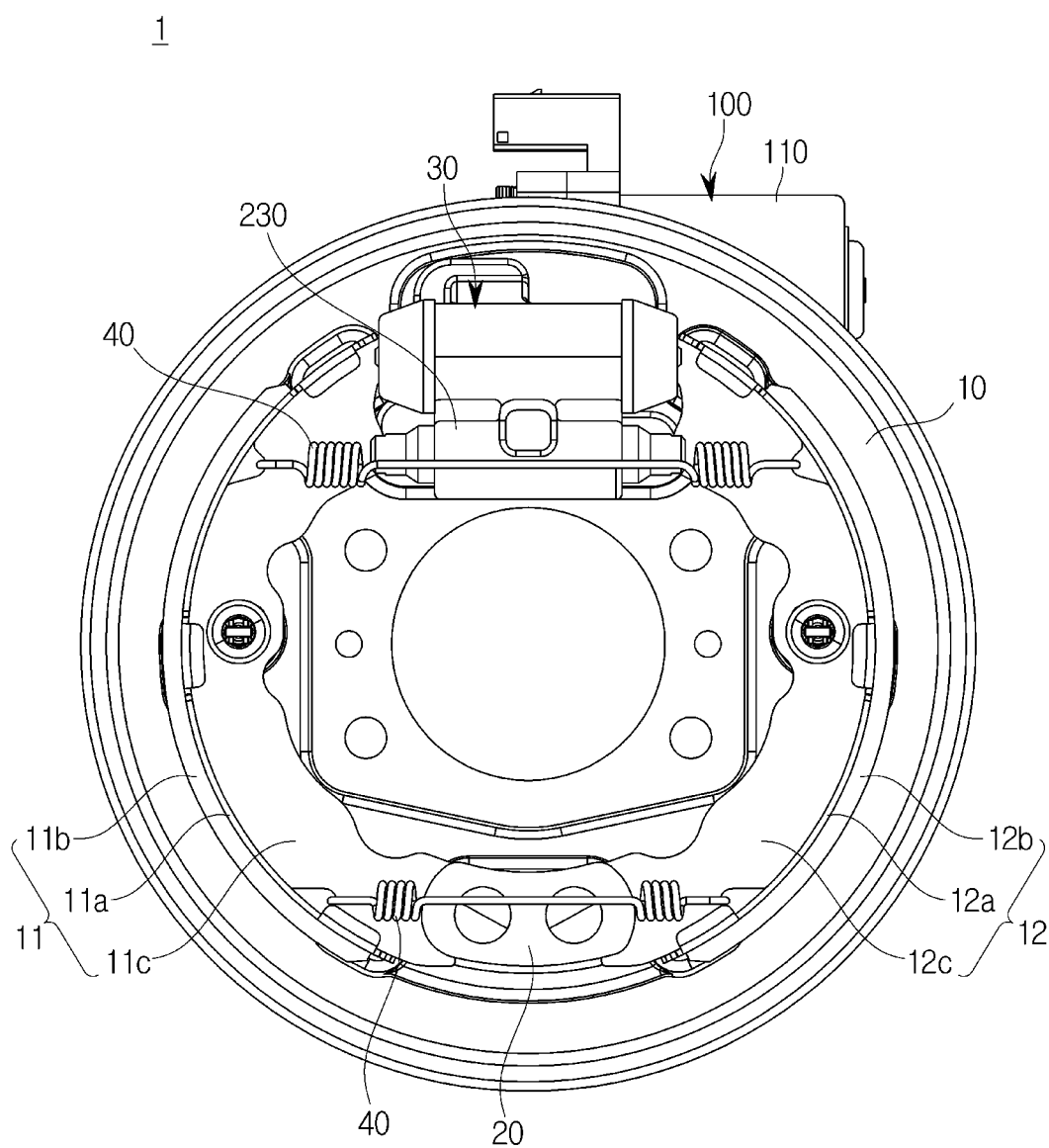
FIG. 1 is a front view illustrating a motor-driven drum brake applied to a motor-driven drum brake system according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Figure 2:
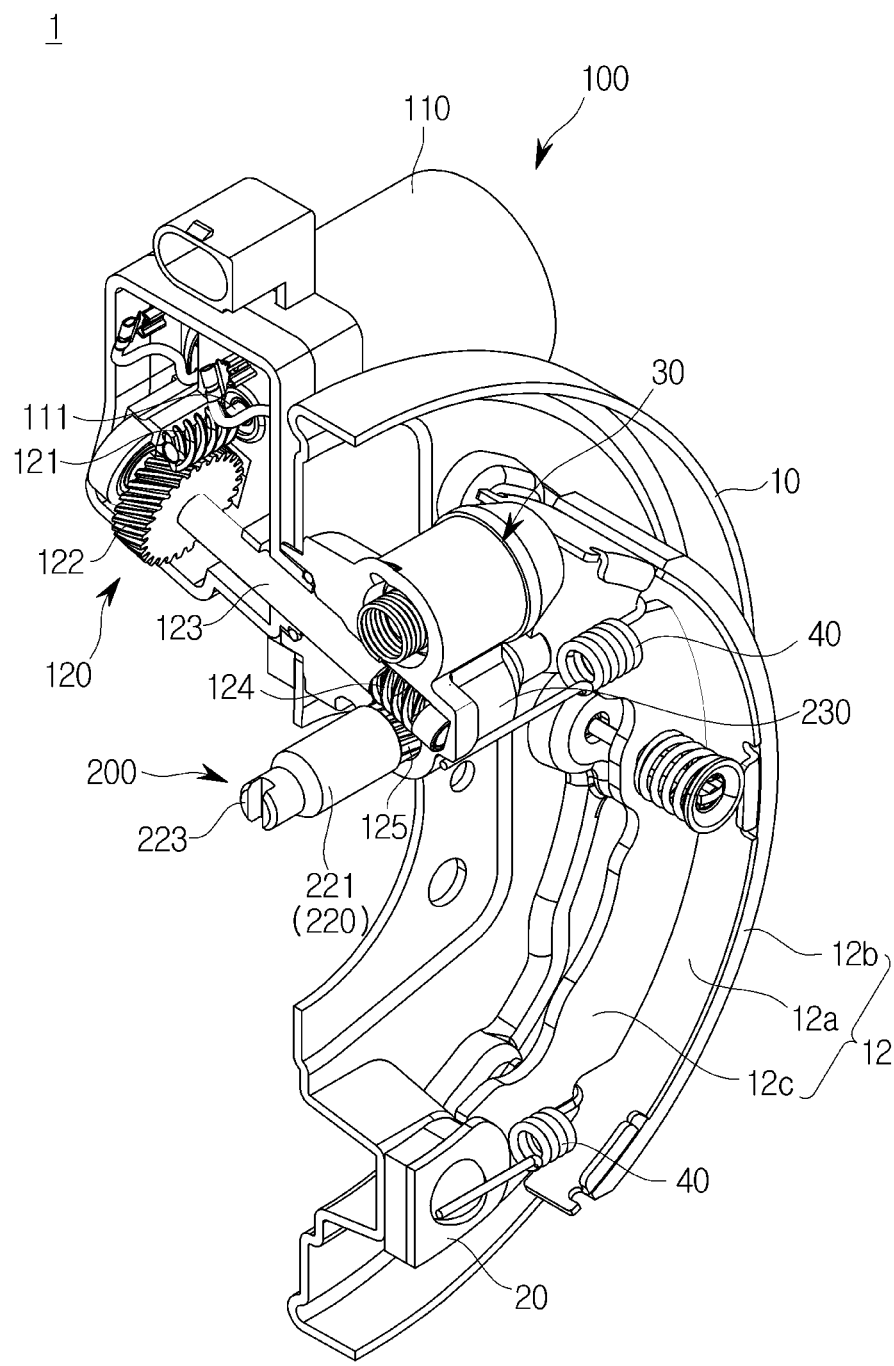
FIG. 2 is a partially cut-away perspective view illustrating a motor-driven drum brake applied to a motor-driven drum brake system according to an embodiment.
Figure 3:
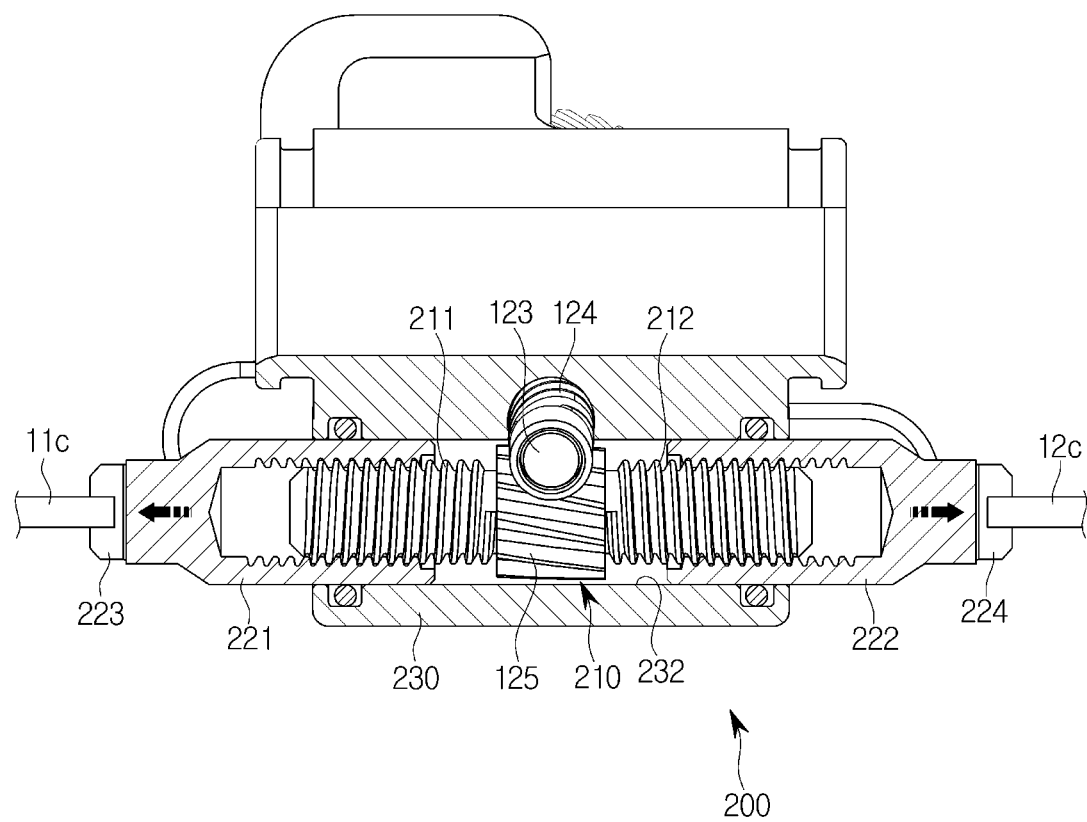
FIG. 3 is a view illustrating generating a clamping force in a motor-driven drum brake of a motor-driven drum brake system according to an embodiment.

FIG. 1 is a front view illustrating a motor-driven drum brake applied to a motor-driven drum brake system according to an embodiment, FIG. 2 is a partially cut-away perspective view illustrating a motor-driven drum brake applied to a motor-driven drum brake system according to an embodiment, and FIG. 3 is a view illustrating an operation of generating a clamping force in a motor-driven drum brake of a motor-driven drum brake system according to an embodiment.

Referring to FIGS. 1 to 3, a motor-driven drum brake 1 includes a pair of brake shoes 11 and 12 disposed on opposite sides of the inside of a drum (not shown) rotating together with a wheel of a vehicle, an electric actuator 100, and a power conversion unit 200 receiving rotational force from the electric actuator 100 to compress the pair of brake shoes 11 and 12 or release of the compression.

The pair of brake shoes 11 and 12 are mounted on a back plate 10 coupled to the vehicle body so as to operate outward and come in contact with an inner circumferential surface of the drum to generate braking force.

The pair of brake shoes 11 and 12 are provided in an arc shape and are supported by an anchor block 20 at the lower end, and includes a first brake shoes 11 arranged on a forward rotation direction side of the drum with respect to the anchor block 20 and a second brake shoe 12 arranged on the opposite side. Each of the first and second brake shoe 11 and 12 includes a semicircular rim 11*a* or 12*a* to which a lining 11*b* or 12*b* is attached, and a web 11*c* or 12*c* coupled to an inner circumferential surface of the rim 11*a* or 12*a* to support the rim 11*a* or 12*a*.

Between one end of the web 11*c* of the first brake shoe 11 and one end of the web 12*c* of the second brake shoe 12, the anchor block 20 supports the pair of brake shoes 11 and 12 to prevent the pair of brake shoes 11 and 12 from being separated during a braking operation, and between the other end of the web 11*c* of the first brake shoe 11 and the other end of the web 12*c* of the second brake shoe 12, a wheel cylinder 30 is installed to operate the first brake shoe 11*b* and 12*b* outward such that linings 11*b* and 12*b* come in close contact with the drum to generate a braking force.

Therefore, when braking hydraulic pressure is transmitted to the wheel cylinder 30, a piston built in the wheel cylinder 30 advances outward, which in turn allows the pair of brake shoes 11 and 12 to be pushed outward at the other end and rotated with respect to the anchor block 20 at the one end, so that the pair of brake shoes 11 and 12 make a friction with the inner circumferential surface of the drum, thereby generating a braking force.

On the other hand, reference numeral "40" designates a return spring that allows the two brake shoes 11 and 12 to return to the original states after braking.

The electric actuator 100 includes a motor 110 and a reduction gear portion 120.

The motor 110 is coupled to the back plate 10. The motor 110 is disposed behind the back plate 10, and a part of the motor 110 protrudes to the front of the back plate 10 on which the two brake shoes 11 and 12 are disposed. The part of the motor 110 protruding to the front of the back plate 10 may be coupled to a support plate 230 that supports the power conversion unit 200.

The motor 110 may be provided as a generally known electric motor capable of forward and reverse rotation according to a direction of an applied current. The motor 110 may be provided with a rotation shaft 111, and the rotation shaft 111 may be coupled to a first worm gear 121 of the reduction gear portion 120. The motor 110 may be electrically connected to a controller such that the operation of the motor 110 is electrically controlled. For example, the controller may control motor operations of the motor 110, such as driving and stopping, forward rotation and reverse rotation, and the like.

The reduction gear portion 120 includes the first worm gear 121 coupled to the rotation shaft 111 of the motor 110, a first worm wheel 122 meshed with the first worm gear 121, a worm shaft 123 having one end installed by passing through the first worm wheel 122 and the other end formed with a second warm gear 124, and the second worm wheel 125 meshed with the second warm gear 124.

The first worm gear 121 is coupled to rotate together coaxially with the rotation shaft 111 of the motor 110. In this case, the first worm gear 121 may be integrally formed with the rotation shaft 111. That is, a worm gear-integrated motor may be employed. As the rotation shaft 111 of the motor 110 rotates, the first worm wheel 122 meshed with the first worm gear 121 formed on the rotation shaft 111 receives the rotational force to rotate together with the worm shaft 123.

The second worm wheel 125 rotates in engagement with the second worm gear 124. The second worm wheel 125 may be provided on a spindle member 210 of the power conversion unit 200. The second worm wheel 125 may be coupled to the spindle member 210 to rotate together with the spindle member 210. Amplified by the reduction gear portion 120, a driving force is transmitted to the power conversion unit 200.

The power conversion unit 200 converts the rotational force transmitted from the reduction gear portion 120 into linear motion to press the pair of brake shoes 11 and 12 toward the inner surface of the drum. More specifically, the power conversion unit 200 includes the spindle member 210, a nut member 220 screwed to the spindle member 210, and the support plate 230 for guiding the movement of the nut member 220.

The spindle member 210 has a predetermined length and is disposed to be perpendicular to the worm shaft 123. The spindle member 210 is coupled to the second worm wheel 125 at the center thereof so as to be rotatable together with the second worm wheel 125. The spindle member 210 has a first screw shaft 211 at one side with respect to the second worm wheel 125 and a second screw shaft 212 at the other side. In this case, the first screw shaft 211 and the second screw shaft 212 are provided to have threads in opposite directions to each other. For example, a left-hand thread may be formed on the first screw shaft 211, and a right-hand thread may be formed on the second screw shaft 212.

The nut members 220 are coupled to respective ends of the spindle member 210 in the longitudinal direction. The nut members 220 serve to press the two brake shoes 11 and 12 toward the inner surface of the drum. The nut members 220 may include a first nut 221 screwed to the first screw shaft 211 provided on the one side of the spindle member 210 and a second nut 222 screwed to the second screw shaft 212 provided on the other side of the spindle member 210.

The first nut 221 is provided on an inner circumferential surface thereof with a screw thread to be screwed with the spindle member 210, and at the end thereof with a first support portion 223. Accordingly, in a state in which the first nut 221 is screwed to the first screw shaft 211, the first support portion 223 is supported by the web 11c of the first brake shoe 11.

The second nut 222 is provided with a screw thread on an inner circumferential surface thereof so as to be screwed with the spindle member 210, and with a second support portion 224 at the end thereof. Accordingly, in a state in which the second nut 221 is screwed to the second screw shaft 211, the second support portion 224 is supported by the web 12c of the second brake shoe 12.

The first and second support portions 223 and 224 may be provided in a so-called 'C' shape to be stably supported by the respective webs 11c and 12c. Accordingly, the webs 11c and 12c are inserted into the first and second support portions 223 and 224 to be stably supported. Accordingly, since the first nut 221 and the second nut 222 during rotation of the spindle member 210, which are restricted in rotation by the webs 11c and 12c, linearly move along the longitudinal direction of the spindle member 210 to thereby compress or release the compression of the two brake shoes 11 and 12.

On the other hand, since the first screw shaft 211 and the second screw shaft 212 have respective threads in opposite directions to each other, the first nut 221 and the second nut 222 move in directions away from each other (a parking braking direction) or in directions toward each other (a parking braking release direction) according to the rotation direction of the spindle member 210.

The support plate 230 is provided to surround the outer circumferential surfaces of the spindle member 210 and the nut member 220 and is fixed to the back plate 10, and serves to guide the nut member 220 during linear motion of the nut member 220. The support plate 230 is operated by hydraulic pressure, and may be formed as a unitary body to constitute a cylinder body of the wheel cylinder 30 that compresses the two brake shoes 11 and 12. The support plate 230 may be provided with a guide hole 232 for guiding the movement of the first nut 221 and the second nut 222.

Hereinafter, an engaging operation of the motor-driven drum brake 1 having the above configuration will be described.

First, when the driver operates a parking switch in a state in which the two brake shoes 11 and 12 are spaced apart from the inner surface of the drum, the controller drives the motor 110 to rotate the rotation shaft 111 forward to transmit a rotational force to the reduction gear portion 120. The reduction gear portion 120 has a structure of a worm reducer in which when the first worm wheel 122 meshed with the first worm gear 121 rotates, the worm shaft 123 coupled to the first worm wheel 122 rotates together with the second worm gear 124 formed on the worm shaft 123 to transmit the rotational force to the second worm wheel 125. In this case, the second worm wheel 125, which is provided to rotate together with the spindle member 210 of the power conversion unit 200, causes the spindle member 210 to rotate. As the spindle member 210 rotates, the first nut 221 and the second nut 222 screwed to both sides of the spindle member 210 linearly move to compress the two brake shoes 11 and 12 toward the inner surface of the drum so that parking braking is achieved.

On the other hand, when the engagement is released, the motor 110 may be implemented to generate a driving force in a reverse direction of the engagement.

That is, the motor transmits a rotational force in the same way as the engagement, but rotates in the opposite direction such that the first nut 221 and the second nut 222 move to the respective original positions, causing the parking braking force to be released.

Figure 4:
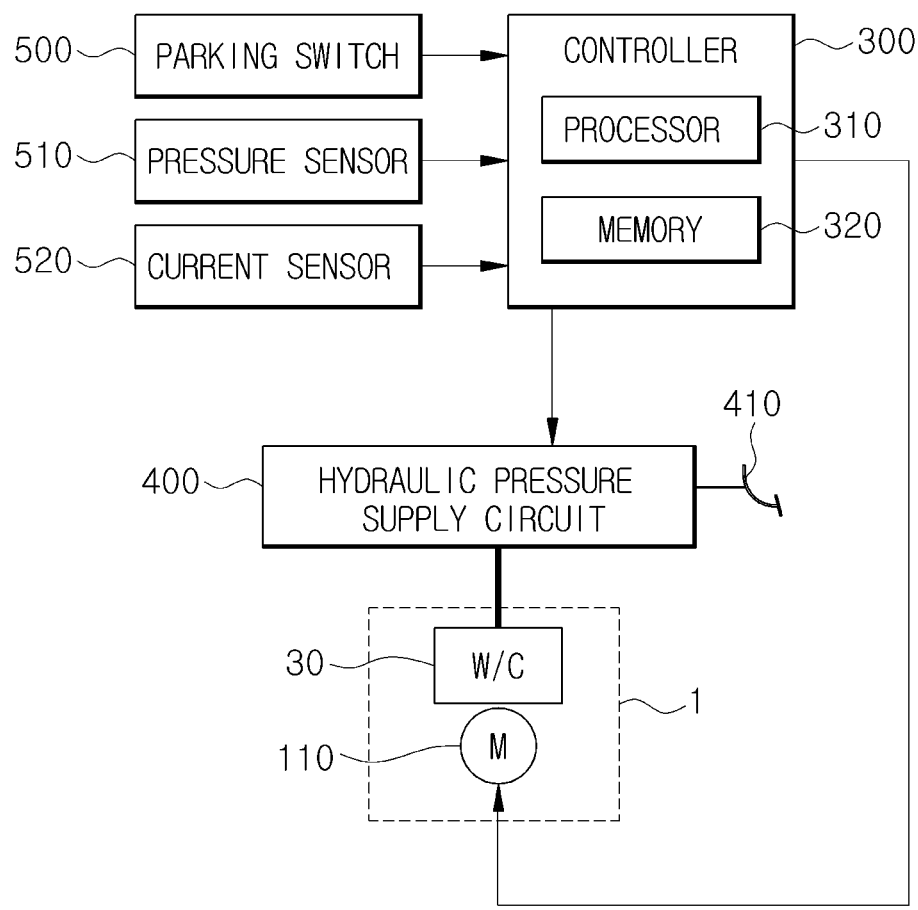
FIG. 4 is a control block diagram illustrating a motor-driven drum brake system according to an embodiment.

FIG. 4 is a control block diagram illustrating a motor-driven drum brake system according to an embodiment.

Referring to FIG. 4, the controller 300 may be referred to as an electronic control unit (ECU).

The controller 300 may include a processor 310 and a memory 320.

The processor 310 may control the overall operation of the motor-driven drum brake system.

The memory 320 may store a program required for the processor 310 to perform processing or control and various types of data for operating the motor-driven drum brake system.

The memory 320 may include not only volatile memories, such as an S-RAM and a D-RAM, but also of non-volatile memories, such as flash memories, read-only memories (ROM), erasable programmable read only memories (EPROMs), and the like.

A hydraulic pressure supply circuit 400 may be connected to the wheel cylinder 30 of the motor-driven drum brake 1 mounted on the wheel. The hydraulic pressure supply circuit 400 includes a master cylinder for generating brake hydraulic pressure by manipulation of a brake pedal 410, a reservoir for storing brake oil, a hydraulic pressure circuit for supplying brake hydraulic pressure to the wheel cylinder 30, and an on/off valve for adjusting the brake hydraulic pressure supplied to the wheel cylinder 30 at a time of the brake hydraulic pressure. The hydraulic pressure supply circuit 400 having the above configuration supplies the wheel cylinder 30 with a brake hydraulic pressure generated in the master cylinder by the manipulation of the brake pedal 410, and drives the on/off valve as needed, to generate a braking force required for the wheel.

A parking switch 500 may be a switch for receiving an intention of the driver to operate the motor-driven drum brake 1, and may be provided adjacent to the driver's seat of the vehicle.

The parking switch 500 may be provided to be turned on or off by the driver.

The parking switch 500, in an on-operation, may transmit a signal corresponding to a parking apply command (an engagement command) to the controller 300, and in an off-operation, transmit a signal corresponding to a parking release command (an engagement release command).

The controller 300 may perform a parking apply mode for engaging the motor-driven drum brake 1 or a parking release mode for releasing the engagement of the motor-driven drum brake 1 by a manipulation signal of the parking switch 500 manipulated by the driver or a manipulation signal generated by a program related to operation of the motor-driven drum brake.

The controller 300 may, in the parking apply mode, perform a parking apply operation by bringing the pair of brake shoes 11 and 12 into close contact with the drum through the electric actuator 100 of the motor-driven drum brake 1 to generate a clamping force required for parking, which is an engagement operation.

The controller 300 may, in a parking release mode, perform a parking release operation by releasing the contact of the pair of brake shoes 11 and 12 with the drum using the motor-driven actuator 100 of the motor-driven drum brake 1 to release the generated clamping force, which is an engagement release operation.

The controller 300 may, in the parking apply mode, rotate the motor 110 in one direction until the electric current value of the motor 110 of the motor-driven actuator 100 reaches a target current value corresponding to a clamping force required for parking.

A current sensor 520 may detect a current flowing in the motor 110 of the motor-driven drum brake 1. The current sensor 520 may detect a motor current flowing through the motor 110 using a shunt resistor or a Hall sensor. The current sensor 520 may employ various types of sensors capable of detecting a motor current, in addition to a shunt resistor or a Hall sensor.

The controller 300 may determine whether the motor current detected by the current sensor 520 has reached the target current during the parking apply operation, to determine whether a current clamping force according to the current motor current has reached a target clamping force according to a target current.

The controller 300 may record a parking apply count, which is the number of times the parking apply operation is performed, in the memory 320 whenever the parking apply operation is performed. The controller 300 may accumulate the recorded counts of parking apply operation to recognize the total count of parking apply operations.

The controller 300 may, in the parking release mode, rotate the motor 110 in the reverse direction until the current of the motor 110 reaches a target current value corresponding to a parking release.

The pressure sensor 510 detects the hydraulic pressure of the wheel cylinder 30 of the motor-driven drum brake 1.

The controller 300 may detect the hydraulic pressure provided to the wheel cylinder 30 through the pressure sensor 510 whenever hydraulic pressure is provided to the wheel cylinder 30 of the motor-driven drum brake 1 during parking apply and braking operations, and record a hydraulic amount calculated from the detected hydraulic pressure and a time for which the hydraulic pressure is provided. The controller 300 may recognize the total hydraulic amount by accumulating the recorded hydraulic amounts. In this case, the controller 300 may calculate the amount of thermal energy use of the brake shoes 11 and 12 through the hydraulic amount, record the calculated amount of thermal energy use in the memory 320, and accumulate the recorded amounts of thermal energy use, to recognize the total amount of thermal energy use.

The controller 300 may determine whether there is a need to correct the clamping force of the motor-driven drum brake 1 based on the total count of parking apply operations of the motor-driven drum brake 1. When the total count of parking apply operations of the motor-driven drum brake 1 is large, the controller 300 may determine that sufficient burnishing has been occurred in the brake shoes 11 and 12, and thus determine that there is a need to perform a clamping force correction of reducing the current clamping force of the motor-driven drum brake 1 to a level lower than a clamping force obtained when sufficient burnishing is not performed.

In addition, the controller 300 may determine whether there is a need to correct the clamping force of the motor-driven drum brake 1 based on the total count of parking apply operations of the motor-driven drum brake 1 and the total hydraulic amount of the motor-driven drum brake 1. Since not only the total count of parking apply operations but also the total hydraulic amount are taken into consideration, the controller 300 may accurately determine whether sufficient burnishing has been performed on the brake shoes 11 and 12.

In addition, the controller 300 may determine whether there is a need to correct the clamping force of the motor-driven drum brake 1 based on the total count of parking apply operations of the motor-driven drum brake 1 and the total thermal energy use of the brake shoes 11 and 12 of the motor-driven drum brake 1.

The controller 300 may, upon determining that correction of the clamping force of the motor-driven drum brake 1 is needed, correct the target clamping force in a direction of reducing the target clamping force of the motor-driven drum brake 1.

The controller 300 reduces the target current according to the corrected target clamping force to perform the parking apply.

Figure 5:
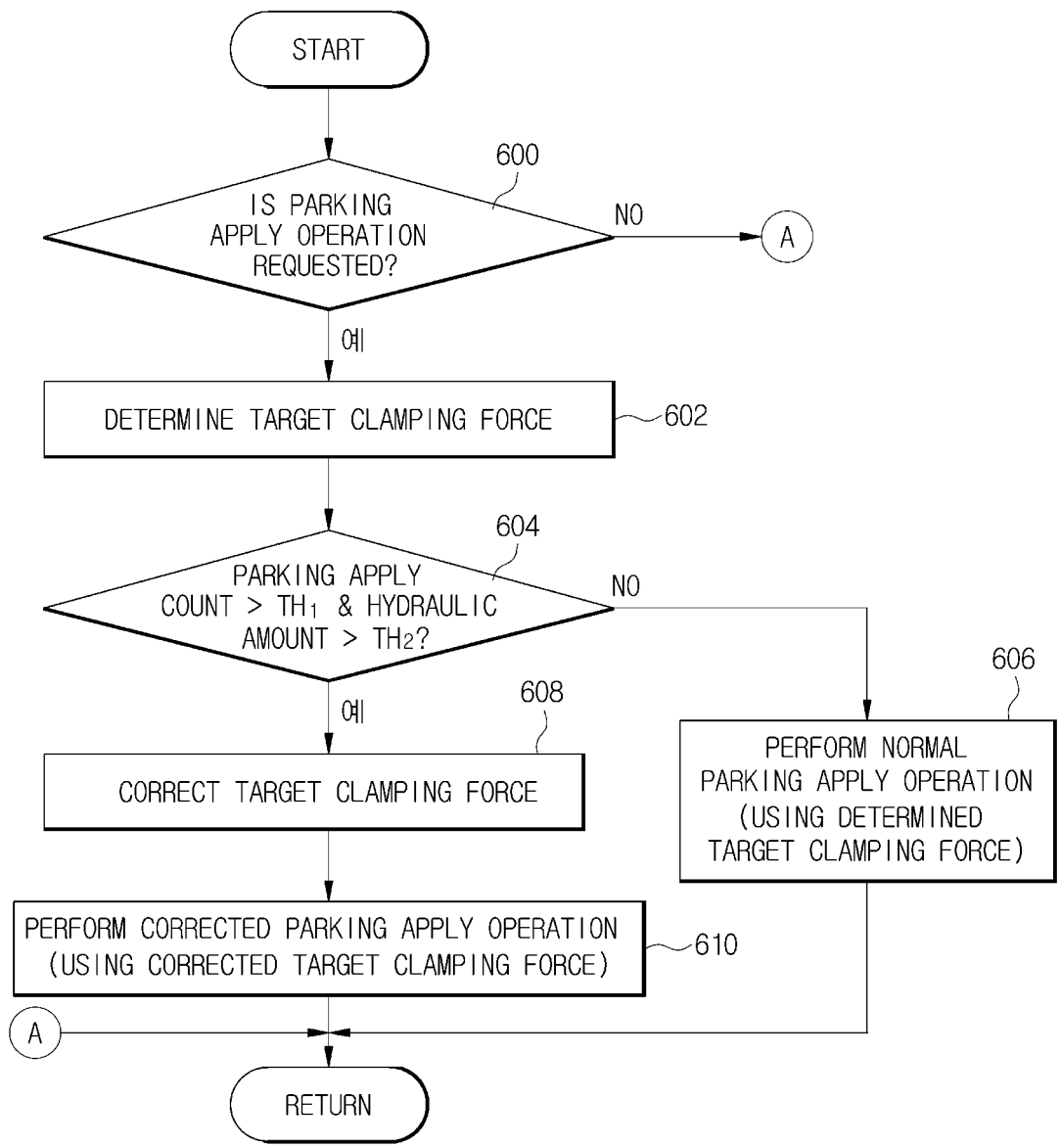
FIG. 5 is a flow chart showing a method of controlling a motor-driven drum brake system according to an embodiment.

FIG. 5 is a flow chart showing a method of controlling a motor-driven drum brake system according to an embodiment.

Referring to FIG. 5, it is determined whether a parking apply operation is requested (600), and upon determining that a parking apply operation is requested, a target clamping force is determined (602), and it is determined whether the total count of parking apply operations of the motor-driven drum brake 1 is greater than a preset count $Th_1$ and the total hydraulic amount is greater than a preset hydraulic amount $Th_2$ (604), and upon determining that the total count of parking apply operations is not greater than the preset count $Th_1$ or the total hydraulic amount is not greater than the preset hydraulic amount $Th_2$, a normal parking apply operation is performed using the determined target clamping force (606), and upon determining that the total count of parking apply operations is greater than the preset count of times $Th_1$ and the total hydraulic amount pressure is greater than the preset hydraulic amount $Th_2$, the determined target clamping force is corrected (608), and a corrected parking apply operation is performed using the corrected target clamping force (610).

The controller 300 may, based on the parking switch 500 being operated in an on-state, determine that the parking apply operation is requested.

The controller 300 may determine the target clamping force according to a vehicle environment, such as the inclination of the vehicle or the battery voltage. The controller 300 may determine the target clamping force according to the vehicle environment according to various techniques generally known in the art.

The controller 300 may, in order to determine the burnishing state of the brake shoes 11 and 12 of the motor-driven drum brake 1, determine whether the total count of parking apply operations of the motor-driven drum brake 1 is greater than the preset count $Th_1$, and the total hydraulic amount is greater than the preset hydraulic amount $Th_2$.

Figure 6:
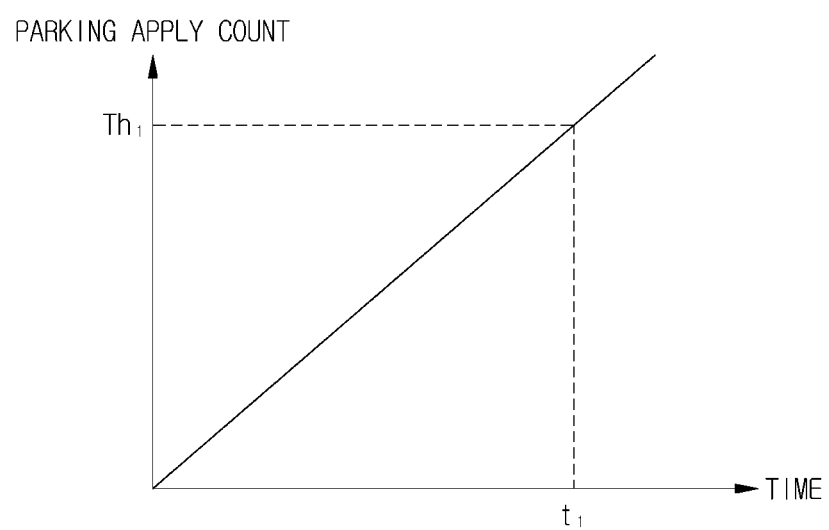
FIG. 6 is a view illustrating determining a burnishing state of a brake shoe based on the total number of parking apply operations in a motor-driven drum brake system according to an embodiment.
Figure 7:
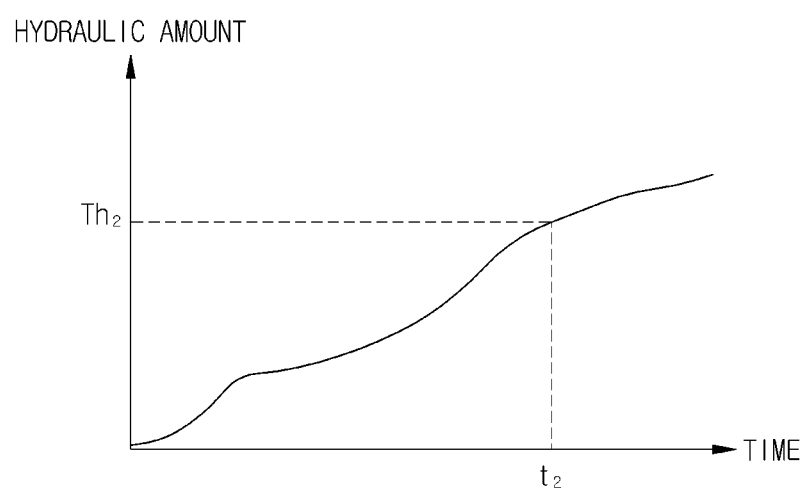
FIG. 7 is a view illustrating determining a burnishing state of a brake shoe based on the total hydraulic pressure in a motor-driven drum brake system according to the embodiment.

FIG. 6 is a view illustrating determining a burnishing state of a brake shoe based on the total number of parking apply operations in a motor-driven drum brake system according to an embodiment, and FIG. 7 is a view illustrating determining a burnishing state of a brake shoe based on the total hydraulic pressure in a motor-driven drum brake system according to the embodiment.

Referring to FIG. 6, the horizontal axis represents time, and the vertical axis represents the count of parking apply operations.

The parking apply count may be stored in the memory 320 at each time of a parking apply operation of the motor-driven drum brake 1, and the burnishing state of the brake shoes 11 and 12 may be determined based on the accumulated count of parking apply operations. That is, if the total count of parking apply operations is large, it may be determined that sufficient burnishing has been performed on the brake shoes 11 and 12.

When the total count of parking apply operations reaches a preset count $Th_1$ at an arbitrary time t1, it may be determined that the brake shoes 11 and 12 are sufficiently burnished.

Referring to FIG. 7, the horizontal axis represents time, and the vertical axis represents hydraulic amount.

The amount of hydraulic pressure provided to the wheel cylinder 30 of the motor-driven drum brake 1 may be stored in the memory 320 at each time of a parking apply operation and a braking operation, and based on the accumulated amount of hydraulic pressure, the burnishing state of the brake shoes 11 and 12 may be determined. That is, when the total amount of hydraulic pressure is large, it may be determined that sufficient burnishing has been performed on the brake shoes 11 and 12.

When the total amount of hydraulic pressure reaches a preset hydraulic amount $Th_2$ at an arbitrary time t2, it may be determined that the brake shoes 11 and 12 are sufficiently burnished.

Referring again to FIG. 5, the controller 300 may, upon determining that the total count of parking apply operations is greater than the preset count Th1 and the total amount of hydraulic pressure is greater than the preset hydraulic amount Th2, reduce the target clamping force to correct the target clamping force (608), and perform a corrected parking apply operation using the corrected target clamping force. The corrected parking apply operation is an operation of performing a parking apply on the motor-driven drum brake 10 until the clamping force of the motor-driven drum brake 1 reaches the corrected target clamping force. The controller 300 may rotate the motor 110 forward until the current of the motor 110 of the motor-driven drum brake 1 reaches a target current corresponding to the corrected target clamping force.

Meanwhile, the above described controller and/or components thereof may include one or more processors/microprocessors combined with a computer-readable recording medium that stores computer-readable code/algorithm/software. The processor (s)/microprocessor(s) may execute the computer-readable code/algorithm/software stored in the computer-readable recording medium to perform the above-described functions, operations, steps, and the like.

The above-described controller and/or components thereof may further include a memory implemented as a computer-readable non-transitory recording medium or a computer-readable transitory recording medium. The memory may be controlled by the above described controller and/or components thereof, and may be configured to store data transmitted to or received from the above described controller and/or components, or store data processed or to be processed by the above described controller and/or components thereof.

The disclosed embodiment can be implemented as a computer-readable code/algorithm/software in a computer readable medium. The computer-readable medium may include a non-transitory computer readable recording medium, such as a data storage device that store data that can be read by a processor/microprocessor. Examples of computer-readable recording media include a Hard Disk Drive (HDD), a Solid State Disk (SSD), a Silicon Disk Drive (SDD), a read-only memory (ROM), a random access memory (RAM), a compact disc read only memory (CD-ROM), a magnetic tape, a floppy disk, an optical data storage device, etc.

As is apparent from the above, the motor-driven drum brake system according to the present disclosure and the method of controlling the same can improve the durability and lifespan of a product by reducing a target clamping force of the motor-driven drum brake according to a burnishing state of a brake shoe.

What is claimed is:
1. A motor-driven drum brake system comprising:
   a motor-driven drum brake including a brake shoe inside a drum and allowing the brake shoe to be pressed on an inner surface of the drum by hydraulic pressure of a wheel cylinder or an operation of a motor to perform braking; and a controller configured to control the motor to engage the motor-driven drum brake, and correct a target clamping force of the motor-driven drum brake based on a burnishing state of the brake shoe, wherein the controller is configured to, upon a total count of parking apply operations of the motor-driven drum brake being greater than a preset count when performing a parking apply operation, correct the target clamping force of the motor-driven drum brake and perform the parking apply operation according to the corrected target clamping force.

2. The motor-driven drum brake system of claim 1, wherein the controller is configured to store a parking apply count for the motor-driven drum brake in a memory whenever a parking apply operation is performed, and accumulate the parking apply count stored in the memory to recognize the total count of parking apply operations.

3. The motor-driven drum brake system of claim 1, wherein the controller is configured to, upon the total count of parking apply operations of the motor-driven drum brake being greater than the preset count and a total hydraulic amount of the motor-driven drum brake being greater than a preset hydraulic amount when performing the parking apply operation, reduce the target clamping force of the motor-driven drum brake.

4. The motor-driven drum brake system of claim 3, wherein the controller is configured to store a hydraulic amount of the motor-driven drum brake in a memory whenever a parking apply operation and a braking operation are performed, and accumulate the hydraulic amount stored in the memory to recognize the total hydraulic amount of the motor-driven drum brake.

5. A method of controlling a motor-driven drum brake system, the method comprising:

controlling a motor-driven drum brake including a brake shoe inside a drum and allowing the brake shoe to be pressed on an inner surface of the drum by hydraulic pressure of a wheel cylinder or an operation of a motor to perform braking, comparing a total count of parking apply operations of the motor-driven drum brake with a preset count when performing a parking apply operation;

correcting a target clamping force of the motor-driven drum brake based on a burnishing state of the brake shoe; and performing the parking apply operation according to the corrected target clamping force, wherein the correcting of the target clamping force is performed when a result of the comparison is that the total count of parking apply operations is greater than the preset count.

6. The method of claim 5, wherein the correcting of the target clamping force is performed upon the total count of parking apply operations of the motor-driven drum brake being greater than the preset count and a total hydraulic amount of the motor-driven drum brake being greater than a preset hydraulic amount.

7. The method of claim 6, further comprising:

accumulating a parking apply count stored in a memory whenever a parking apply operation is performed, to recognize the total count of parking apply operations; and accumulating a hydraulic amount of the wheel cylinder stored in a memory whenever a parking apply operation and a braking operation are performed, to recognize the total hydraulic amount of the motor-driven drum brake.

* * * * *